United States Patent Office 3,136,668
Patented June 9, 1964

3,136,668
SOLID PROPELLANT COMPOSITIONS AND
THEIR PREPARATION
Warren C. Simpson, El Cerrito, Thomas F. Mika, Orinda, and John C. Illman, El Cerrito, Calif., assignors to Shell Oil Company, New York, N.Y., a corporation of Delaware
No Drawing. Filed Dec. 8, 1961, Ser. No. 158,103
25 Claims. (Cl. 149—19)

This invention relates to new solid propellant compositions. More particularly, the invention relates to new solid propellant compositions useful as fuels for rockets, which compositions are prepared by the use of a new resinous binder, and to a method for their preparation.

Specifically, the invention provides new and particularly useful solid propellants useful as fuels for rockets comprising a composition having an inorganic oxidizer, and preferably ammonium perchlorate, dispersed in a cured reaction product of a mixture comprising (1) a polyepoxide having more than one vic-epoxy group, (2) an epoxy curing agent, and preferably a polymerized unsaturated long chain acid, and (3) a bituminous material. The invention also provides a new and efficient process for preparing these new propellants.

It is common practice to use in the combustion chamber of rocket propulsion motors composite solid propellants which burn to produce combustion products which are exhausted in a nozzle at high velocity to produce a thrust. These propellant charges are composed of an oxidizer, generally inorganic, and a binder. The binders used for these propellants must have a high degree of flexibility at low and high temperatures, must not deform or melt at high temperatures, must have good storage stability, and must have good adhesion and satisfactory curing characteristics.

It has been proposed to use a great variety of types of resinous binders. The resinous compositions used at the present time are not particularly satisfactory and present many problems which have not been resolved. Many of the binders, for example, are quite toxic and require special handling. Some of the binders are also water sensitive. Still others are difficult to cast and require exposure to high temperatures for long periods to effect the desired cure. Still others require strict observance of stoichiometry during preparation in order to obtain products having the desired properties. Many of the binders are also rather expensive to produce and as a result could not be used for any large scale commercial or military application.

It is an object of the invention, therefore, to provide new solid propellant compositions. It is an object of the invention to provide new solid propellants which are particularly useful as fuels for rocket propulsion motors. It is a further object to provide new solid propellant compositions which contain non-toxic binders. It is a further object to provide solid propellant compositions which are not water sensitive. It is a further object to provide solid propellant compositions which can be easily cast and cured at normal temperatures. It is a further object to provide propellant compositions which can be prepared without strict observance of stoichiometry during preparation. It is a further object to provide propellant compositions which can be produced at a relatively low cost. It is still a further object to provide solid propellant compositions which have good flexibility. It is a further object to provide solid propellant compositions which have excellent resistance to deformation at elevated temperatures. It is a further object to provide new solid propellants which have good burning rate. It is a further object to provide new propellants which have low shrinkage on cure and good adhesion to metal or to fiberglass or plastic motor cases or liners. These and other objects of the invention will be apparent from the following detailed description thereof.

It has now been discovered that these and other objects of the invention may be accomplished by the new propellants comprising compositions having an inorganic oxidizer, and preferably ammonium perchlorate, dispersed in a cured reaction product of a mixture comprising (1) a polyepoxide having more than one vic-epoxy, (2) an epoxy curing agent, and preferably a polymerized unsaturated long chain acid, and (3) a bituminous material, and preferably a bituminous material having a softening point below 150° F. and which is substantially soluble in the uncured mixture of polyepoxide and curing agent at 60° C. to 100° C., such as for example, an extract of a lube oil distillate. It has been unexpectedly found that these special solid propellants avoid many of the above described defects of the prior known propellants. These compositions, for example, are not water sensitive, are non-toxic, and are easy to cast and can be cured at low temperatures. In addition, the new compositions can be prepared without strict observance of the stoichiometry of the reaction and are thus more easily prepared. It has also been found that the presence of the large amount of the low cost bituminous material renders the new compositions far less expensive than the known propellants.

The bituminous material used in the composition of the present invention include substances composed mainly of carbon and hydrogen although they may contain amounts of sulfur, nitrogen and oxygen-containing materials. They also are preferably fusible and largely soluble in carbon disulfide. The bituminous materials also preferably have a softening point below 150° F. and are substantially soluble in the uncured mixture of polyepoxide and epoxy curing agent at 60° C. to 100° C.

An especially preferred group of bituminous materials to be used in the compositions of the invention include the asphalts. These asphalts may be straight run, blown, cracked and catalytically or non-catalytically polymerized asphalts.

Especially preferred are the straight run asphalts used for paving, such as those having penetrations between 40 and 300 and softening points within the range of from about 145° F. to about 80° F. Blown asphalts are normally produced in the presence or absence of catalysts by blowing asphalts or fluxes at elevated temperatures with an oxygen-containing gas such as air. Preferred blown asphalt has softening point range of between about 150° F. and about 120° F. and a penetration within the range from about 150 to about 50.

Aromatic asphalts, such as those comprising the bottoms products from the distillation of catalytically cracked gas oil, are also preferred.

Other preferred materials include high boiling extracts of petroleum, such as those obtained by extracting various petroleum products, such as lube oils and the like, with various solvents as may have preferential selectivity for aromatics. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the furfural extracts of petroleum distillates or the Edeleanu extracts, i.e., extracts obtained by the use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Particularly outstanding results are obtained by using mixtures of the aforementioned extracts and lube distillates. By varying the proportions in the mixtures one is able to adjust the properties. Larger amounts of the lube distillate, for example, increases tensile strength.

Another preferred group of bituminous materials include residual fuel oils, such as residual fuel oils having a viscosity between 10 cs. at 100° F. to about 1500 cs. at 100° F.

Also preferred are the products derived from coal such as coal tars, refined coal tars and coal tar pitches, and preferably those having a softening point below 150° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannal, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50, and low melting coal tar pitches having a fusing point below 120° F. and a solubility in carbon disulfide of at least 75%.

The polyepoxides to be used in preparing the compositions of the invention comprise those materials possessing more than one vicinal epoxy group, i.e., more than one

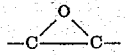

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearte, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl phthalate, diglycidyl adipate, di(2,3-epoxybutyl) adipate, di(2,3-epoxybutyl) oxalate, di(2,3-epoxyhexyl) succinate, di-(3,4-epoxybutyl) maleate, di(2,3-epoxyoctyl) pimelate di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tertarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like. Preferred polyepoxides include the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.) polyglycidyl ether of 1,1,5,5-tetrakis (hydroxyphenyl) pentane (epoxy value 0.514 eq./100 g.) and the like and mixtures thereof.

A special class of glycidyl polyethers are those wherein the polyhydric phenol radicals each contain at least one and preferably 2 to 4 nitro radicals as substituents on the phenolic ring. The presence of these nitro radicals appear to improve the compatibility of the resulting polymer with bituminous substances and moreover provides a source of oxygen found to be highly desirable when the entire fuel composition is subjected to combustion. The following are typical of the nitro phenolic substances useful in the preparation of the glycidyl ethers:

2,2-bis(2-nitro-4-hydroxyphenyl)propane
2,2-bis(2,5-dinitro-4-hydroxyphenyl)propane
4,4'-dihydroxy-3,3'-dinitrobenzophenone
bis(2,3-dinitro-4-hydroxyphenyl)methane
1,1-bis(3,5-dinitro-4-hydroxyphenyl)methane
2,2-bis(3-nitro-4-hydroxy-2-butylphenyl)propane Coming under special consideration because of the superior properties of the resulting propellants are the glycidyl esters of polycarboxylic acids containing at least 7 carbon atoms in the acid molecule, and mixtures thereof with any of the above-described glycidyl polyethers, said glycidyl esters making up at least 10% by weight of the mixture. Particularly preferred glycidyl esters are the glycidyl esters of polycarboxylic acids containing from 20 to 70 carbon atoms and especially the polymerized unsaturated fatty acids, such as, for example, dimerized and trimerized $C_{18}$ unsaturated fatty acids as linoleic acid, such as described hereinafter relative to the epoxy curing agent.

The epoxy curing agent employed in the binder composition is preferably an acid or acidic material, such as an acid anhydride. Examples of these include polycarboxylic acids, such as, for example, eicosanedioic acid, 1,18-octadecanedioic acid, sebacic acid, adipic acid and the like, and preferably the polycarboxylic acids obtained by polymerizing the long chain unsaturated acids, such as polymerized fatty acids derived from semi-drying and drying oils. Examples of such acids include those containing more than 14 carbon atoms, such as dodecenedioic acid, 10,12-eicosadienedioic acid, linoleic acid, linolenic acid, eleostearic acid, licanic acid and the like.

Normally, the polymerization of the unsaturated acids is effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 28 (1946). The structure of some of the polymerized acids is shown in Industrial and Engineering Chemistry, vol. 32, page 89 (1941).

Particularly preferred are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following

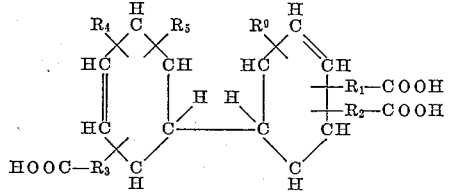

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each.

Examples of other preferred acidic curing agents include the polymers and copolymers of ethylenically unsaturated acids, and preferably those acids containing no more than 6 carbon atoms, such as, for example, acrylic acid, methacrylic acid, ethacrylic acid, crotonic acid, 5-hexenoic acid, 3-methyl-2-butenoic acid, 3-ethyl-2-pentenoic acid, chloroacrylic acid, 3-chloro-2-butenoic acid and the like. Particularly preferred acids are the terminally unsaturated acids and still more preferably the alpha,beta-unsaturated monocarboxylic acids containing up to 4 carbon atoms, such as acrylic acid and methacrylic acid.

The ethylenically unsaturated monomers that may be copolymerized with the above-described acids include those copolymerizable unsaturated monomers containing one or more ethylenic groups, such as, for example, styrene, alpha-methylstyrene, p-methoxystyrene, p-octylstyrene, vinyl toluene, beta-vinyl naphthalene, 2,4-dichlorostyrene, 3,5-dimethylstyrene, butadiene, isoprene, 1,3-dimethylpentadiene, cyclopentadiene, propylene, ethylene, butylene, isobutylene, octylene, decylene, octadecene, acrylonitrile, vinyl ethyl ether, vinyl acetate, allyl acetate, vinyl benzoate, allyl stearate, allyl cyclohexanecarboxylate, methacrylonitrile, vinyl chloride, methyl methacrylate, ethyl acrylate, diallyl phthalate, allyl acrylate, divinyl succinate, allyloxypropionaldehyde, diallyl ether of ethylene glycol, triallyl ether of glycerol, allyl ether of pentaerythritol, N-allyl acrylamide, and the like, and mixtures thereof.

Particularly preferred copolymers are those obtained by polymerizing the unsaturated acid with a dissimilar monomer of the group consisting of the unsaturated hydrocarbons containing up to 15 carbon atoms, and preferably the mono- and diethylenically unsaturated aliphatic, cycloaliphatic and aromatic-substituted aliphatic hydrocarbons containing up to 10 carbon atoms, such as styrene, butadiene and the like; and the alkenyl alkyl ethers and alkenyl esters of mono- and polycarboxylic acids.

The above-described homopolymers and copolymers may be prepared by heating the desired mixture of monomers together in the presence of a free radical-yielding catalyst, such as benzoyl peroxide, cumene hydroperoxide, tertiary butyl hydroperoxide, ditertiary butyl peroxide, and the like, in amounts varying from about .1% to 5% by weight of monomer being polymerized. In the case of the copolymers, the monomers may be added altogether at the beginning or one or more may be added in small amounts throughout the course of the reaction or in any desired portions or point during the reaction. The ratio of monomers in the final product may also vary over a wide range, say from 5% of the acid to 95% of the dissimilar monomer to 1% of the additional dissimilar monomer to 99% of the acid.

Examples of other preferred acid materials that may be used include the partial esters of polyhydroxy-containing compounds and polycarboxylic acids or polycarboxylic acid anhydrides. Examples of the polyhydroxy-containing compounds include those compounds having at least 2 and preferably 2 to 4 OH groups which are separated by two and preferably 4 carbon atoms, such as ethylene glycol, diethylene glycol, tetraethylene glycol, propylene glycol, dipropylene glycol, butylene glycol, dibutylene glycol, glycerol, hexanetriol, pentaerythritol, 1,4-dihydroxycyclohexane, glycerol monoacetate, glycerol monostearate, thiodipropanol, thiodibutanol, sulfonyl dipropanol, polyols obtained by reacting dihydric phenols with epichlorohydrin and ethylene chlorohydrin as in U.S. 2,558,949, and the like, and mixtures thereof. Other examples include the polyhydroxy compounds obtained by reacting any one or more of the above-described polyhydric alcohols with an alkylene oxide, such as ethylene oxide or propylene oxide.

The polycarboxylic acid or anhydride used in making the partial esters described above may be exemplified by any of the above-described polycarboxylic acids which may be used as curing agents by themselves as well as a special group of adducts obtained by condensing a polyethylenically unsaturated compound and an ethylenically unsaturated acid anhydride, such as maleic anhydride. The polyethylenically unsaturated compounds are preferably those having at least 10 carbon atoms and possessing at least one functional group, such as, for example, unsaturated fatty acids as linseed oil fatty acids, soy oil fatty acids, dehydrated castor oil fatty acids, chinawood oil fatty acids, linolenic acids and other similar unsaturated fatty acids as well as rosin acids and mixtures of rosin acids and fatty acids, such as are present in tall oil, alkyd esters of these unsaturated fatty acids, as well as the glycerol esters of the acids, ethylenically unsaturated hydrocarbons, such as octadecene, nondecadiene, tetradecadiene, their halogenated derivatives as well as alkoxy and sulfur-containing derivatives. These adducts are preferably prepared by heating the two components together in approximately equivalent proportions, such as one mole of the ethylenically unsaturated compound with one mole of the butenedioic acid anhydride. Temperatures employed preferably range from about 400° F. to about 500° F. but higher or lower temperatures may be employed as needed. Time of heating generally varies between about .5 to 7 hours.

The partial esterification of the polyhydric compounds with the acid or anhydride may be prepared by simply heating the acid or anhydride with the polyhydric compound in equivalent proportions, i.e., sufficient amount to furnish up to two acid groups or one anhydride group per OH to be esterified. Temperatures employed in the reaction may vary depending on the nature of the reactants, but in most cases, temperatures will range from about 300° F. to about 500° F. Solvents, such as inert hydrocarbons as benzene, toluene and the like may be utilized to facilitate the reaction, and in the case of formation of water, to assist in the removal of the water by azeotropic distillation.

Another preferred group of epoxy curing agents include, among others the polythiopolymercaptans obtained by treating polymercaptans with agents, such as hydrogen peroxide or sodium peroxide. Polymers of the formula $HS(C_2H_4OCH_2OC_2H_4SS)_nC_2H_4OCH_2OC_2H_4SH$ wherein $n$ is 1 to 50 may be obtained, for example, by reacting dimercapto diethyl formal with hydrogen peroxide. A more detailed description of this type of polymer may be found in Patrick, U.S. 2,466,963. Polythiopolymercaptans useful in the process of the invention may also be prepared by reacting an organic dihalide with sodium polysulfide to form a high molecular weight polymer containing a plurality of disulfide linkages and then depolymerizing or degrading the polymer, preferably by treating a water dispersion of the polymer with sodium hydrosulfide and sodium sulfite. The molecular weight of the resulting polythiopolymercaptan may be controlled by regulating the proportions of reactants. A more detailed description of the preparation of these polymers may be found in Patrick, U.S. 2,466,963.

Polythiopolymercaptans having molecular weights below about 20,000 and preferably below 12,000 are generally preferred. Particularly preferred polythiopolymercaptans are the liquid polythiopolymercaptans having a molecular weight between 300 and 6000.

Other epoxy curing agents which may be used but are less preferred are those containing a plurality of amine hydrogen. These materials are preferably used in compositions wherein the oxidizer is something other than an ammonium salt as the amines tend to combine with the oxidizer and release ammonia.

A preferred group of these amino hydrogen containing epoxy curing agents include the amino-terminated polyamides, and particularly the reaction product of an aliphatic or cycloaliphatic polyamine and a polycarboxylic acid.

Examples of the polycarboxylic acids used in making the polyamides include any of those described above for use as curing agents by themselves, and particularly the polymerized unsaturated fatty acids described above.

The aliphatic polyamines used in preparing the polyamides may be any di-, tri- or polyamine such as, for example, ethylene diamine, diethylene triamine, triethylene tetramine, tetraethylene pentamine, 1,4-diaminobutane, 1,3-diaminobutane, hexamethylene diamine, 3-(N-isopropylamino)propylamine, and the like. Particularly preferred polyamines are those containing from 2 to 12 carbon atoms, and especially those of the formula

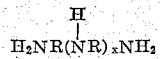

wherein $x$ is an integer of 0 to 10 and R is a bivalent hydrocarbon radical containing from 1 to 10 carbon atoms. Coming under special consideration are those polyamines having at least 3 atoms intervening between the amine groups principally involved in the amidification reaction. These three atoms may be carbon atoms or hetero atoms, such as nitrogen atoms.

Especially preferred polyamides are those derived from the aliphatic polyamides containing no more than 12 carbon atoms and polymeric fatty acids obtain by dimerizing and trimerizing ethylenically unsaturated fatty acids containing up to 24 carbon atoms. These preferred polyamides have a viscosity between 10 and 1750 poises at 40° C., and preferably 20 to 250 poises at 40° C. Preferred polyamides also have amine values between 50 and 450. Amine number is number of milligrams of KOH equivalent to the free amino groups present in one gram of the polyamide.

Coming under special consideration are the fluid polyamides produced by the condensation of polymerized linoleic acid with an aliphatic polyamine, e.g., diethylene triamine, and having the following properties: amine value 210–230, a viscosity of 500–750 poises at 40° C., specific gravity of 0.99 and weighing about 8.3 pounds per gram.

The polyamides used in the process of the invention preferably possess at least one and more preferably two or more hydrogen attached to amino nitrogen atoms or carboxyl hydrogen atoms. Such products are obtained by controlling the proportion of reactants so that there is always at least one amino hydrogen or carboxyl group, such as, for example, by using an excess of the polyamine reactant. A process for making such polyamides (to obtain free amino groups) or an excess of acid (to obtain carboxyl groups) is illustrated in U.S. 2,450,940 and U.S. 2,695,908 and so much of these patents relative to the preparation of the polyamides is incorporated herein by reference.

Examples of other less preferred amines include, among others, the aliphatic polyamines, such as, for example, ethylene diamine, diethylene triamine, triethylene tetramine, tetraethylene pentamine, 1,4-aminobutane, 1,3-diaminobutane, hexamethylene diamine, 3-(n-isopropylamino)propylamine, N,N'-diethyl-1,3-propanediamine, hexapropylene heptamine, penta(1-methyl-propylene)hexamine, tetrabutylenepentamine, hexa-(1-1-dimethylethylene)-heptamine, di(1-methylbutylene)triamine, pentaamylhexamine, tri(1,2,2 - trimethylethylene)tetramine, tetra(1,3 - dimethylpropylene)pentamine, pental(1,5-dimethylamylene)hexamine, penta-(1,2-dimethyl-1-isopropylethylene)hexamine and N,N' - dibutyl-1,6-hexanediamine.

Aliphatic polyamines coming under special consideration are the alkylene polyamines of the formula $$N_2H(RNH)_nH$$

wherein R is an alkylene radical, or a hydrocarbon-substituted alkyklene radical, and $n$ is an integer of at least one, there being no upper limit to the number of alkylene groups in the molecule.

Especially preferred aliphatic polyamines comprise the polyethylene polyamines of the formula

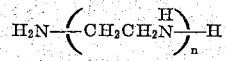

wherein $n$ is an integer varying from about 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine and having related higher polymers which increase in complexity with increasing molecular weights. The remaining 80–20% of the mixture is diethylene triamine employed in such proportions that the mixture is fluid at about room temperature (60–90° F.).

Other examples include the polyamines possessing cycloaliphatic ring or rings, such as, for example, 1-cyclohexylamino-3-aminopropane, 1,4-diaminocyclohexane, 1,3 - diaminocyclopentane, di(aminocyclohexyl)methane, di(aminocyclohexyl)sulfone, 1,3-di(aminocyclohexyl)propane, 4-isopropyl-1,2-diaminocyclohexane, 2,4-diaminocyclohexane, N,N'-diethyl-1,4-diaminocyclohexane, and the like. Preferred members of this group comprises those polyamines having at least one amino or alkyl-substituted amino group attached directly to a cycloaliphatic ring containing from 5 to 7 carbon atoms. These cycloaliphatic amines are preferably obtained by hydrogenating the corresponding aromatics amine. Thus di(aminocyclohexyl)methane is obtained by hydrogenating methylene dianiline.

Another group of materials that may be used in process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkoxysilyl-propylamines as triethoxysylylpropylamines.

Still another group comprise the aminoalkyl-substituted aromatic compounds, such as, for example, di(aminoethyl)benzene, di(aminomethyl)benzene, tri(aminoethyl)benzene, tri(aminobutyl)naphthalene and the like.

Still another group comprises the polymeric polyamines, such as, may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N-aminoisopropyl-3-butoxypiperazine, N - aminoethylpiperazine, 2,5-dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide polyamine reaction products include, among others, N(hydroxypropyl) diethylene triamine (reaction product of propylene oxide and diethylene triamine) and N(2-hydroxy-4-phenoxypropyl) diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use in the compositions of the present invention. Examples of the monoamines include, among others, secondary amines as dimethylamine, diethylamine, dipropylamine, dibutylamine, di(tert-butyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Any combination or mixtures of the above-described epoxy curing agents may also be used in preparing the propellants.

It is also desirable in some cases to employ materials which accelerate the cure of the above-noted agents. Examples of these include, among others, tertiary amines, amine salts, quaternary ammonium salts, phosphines and the like.

Preferred amines are the tertiary amines, such as, for example, p,p'-bis(dimethylaminophenyl)methane, pyridine, dimethyl aniline, benzyldimethyl amine, dimethylethanolamine, methyldiethanol amine, morpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctyl ammonium chloride, and the like, and mixtures thereof.

The basic nitrogen compounds in the bituminous extender also accelerate the cure.

Other preferred activators to be used are the hydrocarbon tertiary amines, and more preferably the amino- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkyl amines, diaminoalkanes, dialkylene triamines, phenylene diamines and di(aminoaryl)alkanes. Preferred amine salts are the hydrochloride, sulfate and acetate of the above-described preferred amines. The preferred quaternary salts are those of the formula

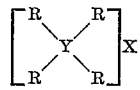

wherein Y is nitrogen, R is an alkyl, aryl or alkylalkyl radical, preferably containing no more than 12 carbon atoms and X is chlorine.

The compositions of the invention include an oxidizing agent. Preferred oxidizing agents include those compounds which are known to the art as agents which furnish oxygen for the combustion reaction which occurs in rocket motors. Examples of oxidizers which may be used include ammonium perchlorate, ammonium nitrate, potassium nitrate, sodium nitrate, $KClO_4$, $LiClO_4$, nitronium perchlorate, potassium dichromate, and the like, and mixtures thereof.

The compositions may also include powdered metals, such as powdered aluminum, boron and magnesium. Preferred metals are the light metals of Groups II and III of the Mendelejeff Periodic Table.

The propellant compositions of the present invention may be prepared by a variety of different methods. They may be prepared, for example, by mixing the bituminous material with the epoxy curing agent, such as the acidic materials noted above, and then combining this mixture with the polyepoxide, oxidizer and metal powder just before the propellant is to be cast. It is also possible to combine all the ingredients together at the same time and mixing before pouring the propellant. It is also possible in many cases to first combine the polyepoxide and the epoxy curing agent, and this is particularly true in the case of the polymerized fatty acids, to effect a type of precondensation before adding the bituminous material and the oxidizer.

The above-noted mixing is preferably done while the components are hot. For example, it is generally preferred to heat the bituminous material and the epoxy curing agent before mixing, and then combine this hot mixture with the polyepoxide at an elevated temperature. Temperatures employed for this preheating and mixing preferably vary from about 150° F. to about 350° F. The mixing may, of course, be done in the cold but this sometimes makes the mixing and handling difficult.

In the case where precondensation of the polyepoxide and curing agent as polymerized acid is desired, the heating of the mixture should be extended to effect the necessary precondensation. The exact time selected will depend, in large part, upon the temperature employed and upon the degree of polymerization of the acid. Precondensation temperatures should normally range between about 50 and 250° C. and the time of precondensation within this temperature range will usually be between about 5 minutes and 120 minutes. Normally, when the precondensation temperature is within the range from about 75 to about 150° C. the time of precondensation will be between about 15 and 60 minutes when the acids are trimerized, as will be between about 3 and 10 hours when the acids are dimerized, with intermediate ranges of time useful when employing mixtures of dimer with trimer.

The proportions of the above-noted components may vary within certain limits. The polyepoxide and the epoxy curing agent are preferably combined in approximately chemical equivalent amounts, i.e., an amount sufficient to furnish one epoxy group for every reactive functional group, such as carboxyl group, mercaptan group, amino hydrogen, and the like. Up to about 50% excess of the polyepoxide may be employed, however, and still obtain the desired results.

The amount of the polyepoxide and epoxy curing agent to be employed in relation to the amount of the bituminous material will preferably vary from about 5% to about 80% by weight, the proportions being governed by the desired properties of the resulting propellant. For example, if a very good substantially infusible composition is desired, the proportion of the polyepoxide and epoxy curing agent should be in excess of 20% by weight, and preferably 20% to 50% by weight.

The amount of the oxidizer in the composition may also vary over a wide range. In general, it is preferred to utilize from 50% to 90% by weight of the oxidizer and from 50% to 10% by weight of the binder. The particularly preferred amount of oxidizer varies from about 70% to 90% by weight and the binder from 30% to 10% by weight.

If desired, part of the oxidizer can be replaced with the metal powder. Preferably up to 30% of the oxidizer can be so replaced. The specific amount of metal will be determined by the stoichiometry of the combustion. For example, if one uses ammonium perchlorate the proportions may vary from 10 to 25 parts of the metal and 70–55 parts of the perchlorate.

After mixing, the compositions are then cast into the desired propellant shape by pouring or otherwise suitable techniques.

The compositions are then cured to convert the mixture to a solid insoluble infusible product. Temperatures employed in the cure will depend on the type of epoxy curing agent selected. If one employs an acidic material, it is generally preferred to employ temperatures ranging from about 100° F. to 140° F. Temperatures much above 240° F. should not be employed due to the presence of the oxidizer. If one employs the active epoxy curing agents, such as the amines or the active thiocompounds, lower temperatures, such as from 50° F. to about 100° F. may be employed.

To illustrate the manner in which the invention may be carried out, the following examples are given. It is to be understood, however, that the examples are for the purpose of illustration and the invention is not to be regarded as limited to any of the specific materials or conditions recited therein. Polyether resins described in the examples by letters, such as polyether A, B and C, are those described in U.S. 2,633,458. Unless otherwise indicated, parts described in the examples are parts by weight.

*Example 1*

This example illustrates the preparation and properties of a propellant using a binder comprising polyether A, polymerized linoleic acid and a lube oil extract.

A binder composition was prepared by mixing at 100–150° C. 25.84 parts of trimerized linoleic acid with 59.76 parts of a lube oil extract from a mixture of San Joaquin Valley crude oils having the following properties:

| | |
|---|---|
| Sp. gr., 60° F | 0.965–1.050. |
| Flash pt., ° F | 380 min. |
| Vis., 210° F | 300 SSU max. |
| 100 | 1191 SSF. |
| 140 | 103. |
| Aromatics (clay/gel analysis) | 74.5%. |
| Saturates | 8.3. |
| Resins | 17.2. |
| RI, 20° C | 1.592. |
| Aniline pt., ° F | 13. |
| Aniline (mixed) | 85. |

To this mixture was added at about 120° C. 14 parts of polyether A and 0.5 part of alpha-methylbenzyl dimethyl amine and the mixture stirred for about 2 minutes.

To 20 parts of this binder mixture was added 15 parts of aluminum powder and 65 parts of bimodal ammonium perchlorate. This addition was made at 140° F. and the mixing was carried out under vacuum for a period of about 30 minutes. The mixture was then cast into the desired propellant and allowed to stand at 140° F. for 4 to 6 days.

The resulting cured propellant demonstrated an elongation of maximum stress of 18%, an elongation at break of 40% and a tensile strength of 85 p.s.i.

The propellant was resistant to creep, as indicated by a stress-relaxation test at 110° F. The slope of the stress decay curve calculated as $$n = -\log_{10} \frac{\text{load at 1 minute}}{\text{load at 10 minutes}} \text{ was} -0.09$$

In a constant strain-test, the propellant was strained 20% of its length at 40° F. and did not fail in 20 days.

Example II

This example illustrates the preparation of a propellant using a binder comprising a mixture of polyether A and a glycidylester of dimerized linoleic acid and a lube oil extract.

A binder composition was prepared by mixing at 150° C. 20.52 parts of trimerized linoleic acid with 59.76 parts of the lube oil extract defined in Example I. To this mixture was added at about 120° C. 19.32 parts of a 1:1 weight mixture of polyether A and glycidyl ester of dimerized linoleic acid having an epoxy value of 0.23 eq./100 g. and a catalyst comprising 0.4 part of alpha-methylbenzyl dimethyl amine and the mixture stirred for about 2 minutes.

To 20 parts of this binder mixture was added 15 parts of aluminum powder and 65 parts of bimodal ammonium perchlorate. This addition was made at 140° F. over a period of about 30 minutes. The mixture was then cast into the desired propellant and allowed to stand at 140° F. for 4 to 6 days.

The resulting cured propellant demonstrated an elongation 24% at maximum stress, tensile strength 114 p.s.i., stress relaxation slope of —0.09 and constant strain life of greater than 20 days.

Example III

This example illustrates the preparation of a propellant from a binder comprising polyether A, an acid-terminated polyester of pentaerythritol and dimerized linoleic acid and a lube oil extract.

A binder composition was prepared by mixing at 150° C. 26.27 parts of an acid-terminated reaction product of 0.28 equivalent of pentaerythritol and 1 equivalent of dimerized linoleic acid, with 59.76 parts of the lube oil extract defined in Example I. To this mixture was added at about 120° C. 13.57 parts of polyether A and 0.4 part of alpha-methylbenzyl dimethyl amine and the mixture stirred for about 2 minutes.

To 20 parts of this binder mixture was added 15 parts of aluminum powder and 65 parts of bimodal ammonium perchlorate. This addition was made at 140° F. over a period of about 30 minutes. The mixture was then cast into the desired propellant and allowed to stand at 140° F. for 4 to 6 days.

The resulting cured propellant demonstrated an elongation at max. stress of 27%, tensile strength of 61, stress relaxation slope of —0.09 and constant strain life of greater than 20 days.

Example IV

This example illustrates the preparation and properties of a propellant prepared with a binder made up of polyether A, a copolymer of butadiene and acrylic acid and a soft asphalt.

34.2 parts of a copolymer of butadiene and acrylic acid having molecular weight of about 1200 and an acidity of 0.068 eq./ 100 g. was mixed at 150° C. with a 200/300 Penn asphalt. To this mixture was added at about 120° C. 5.58 parts of polyether A and 0.40 part of alpha-methylbenzyl dimethyl amine and the mixture stirred for about 2 minutes.

To 20 parts of the binder mixture was added 15 parts of aluminum powder and 65 parts of bimodal ammonium perchlorate. This addition was made at 140° F. over a period of about 30 minutes. The mixture was then cast into the desired propellant and allowed to stand at 140° F. for 4 to 6 days.

The resulting cured propellant demonstrated an elongation at max. stress of 30%, tensile strength of 62 p.s.i., stress relaxation slope of —0.10 and constant strain life of greater than 20 days.

Example V

Example I was repeated with the exception that the amount of lube oil extract employed was 49.75 parts, the trimerized acid was 29.57 parts and the polyether A was 20.18. The resulting propellant had an elongation at break of 35%, tensile strength of 169, stress relaxation slope of —0.09.

Example VI

Example I was repeated with the exception that the polyether A was replaced with 19.28 parts of a mixture of 88 parts polyether A and 12 parts of butyl glycidyl ether. The amount of trimer acid was 29.28 and the amount of lube oil extract was 49.26. The resulting product had an ultimate elongation 40%, tensile strength of 105 and stress relaxation slope of —0.24 and constant strain life of greater than 20 days.

Example VII

Example I was repeated with the exception that the polyether A was replaced with a 1:1 mixture of polyether A and a glycidyl ether of glycerol. A strong flexible casting was obtained.

Example VIII

A binder composition was prepared by mixing at 150° C. 60.72 parts of the lube oil extract defined in Example I, with 26.88 parts of trimerized linoleic acid. To this mixture was added at about 120° C. 12.16 parts of epoxidized methyltetrahydrobenzyl methyltetrahydrobenzoate, and 0.25 part of stannous octoate, and this mixture stirred for about 2 minutes.

To 20 parts of this binder mixture was added 15 parts of aluminum powder and 65 parts of bimodal ammonium perchlorate. This addition was made at 140° F. over a period of about 30 minutes. The mixture was then cast into the desired propellant and allowed to stand at 140° F. for 4 to 6 days.

The resulting cured propellant demonstrated an elongation at break of 35%, tensile strength of 44, stress relaxation slope of —0.16 and constant strain life of greater than 20 days.

Example IX

A binder composition was prepared by mixing at 150° C. 59.29 parts of the lube oil extract defined in Example I, with 11.22 parts of trimerized linoleic acid. To this mixture was added at about 120° C., 28.30 parts of a condensate of dimer acid and polyether A having an epoxy value of 0.141 eq./100 g., and a catalyst made up of 1.18 parts of alpha-methylbenzyl dimethyl amine, and the mixture stirred for about 2 minutes.

To 20 parts of this binder mixture was added 15 parts of aluminum powder and 65 parts of bimodal ammonium perchlorate. This addition was made at 140° F. over a period of about 30 minutes. The mixture was then cast into the desired propellant and allowed to stand at 140° F. for 4 to 6 days.

The resulting cured propellant demonstrated an elongation at break of 51%, and a tensile strength of 46 p.s.i.

Example X

Example I was repeated with the exception that the polyether A was replaced with a glycidyl ether of pentaerythritol. Related results are obtained.

Example XI

Example II was repeated with the exception that the polyepoxide employed was a ⅓ mixture of polyether A and glycidyl ester of dimerized linoleic acid. The resulting product had an elongation of 44%, tensile strength of 51 p.s.i. and constant strain value of greater than 20 days.

Example XII

Example III was repeated with the exception that the triester of pentaerythritol and dimerized linoleic acid, lube oil extract as in Example I and polyether A were employed in the following proportions:

| Polyether A | Acid | Lube Oil Extract |
|---|---|---|
| 14.86 | 34.4 | 49.26 |
| 14.85 | 24.67 | 59.29 |
| 11.16 | 18.57 | 69.38 |

Strong flexible propellants are obtained in each case.

*Example XIII*

Example I was repeated with the exception that the acid employed was an acid terminated polyester of glycerol and dimerized linoleic acid, and the epoxide, acid and lube oil extract were combined in the following ratio: 13.06/26.47/59.29. The resulting product had an elongation of 70% and tensile strength of 37 p.s.i.

*Example XIV*

A binder composition is prepared by mixing at 150° C., 40 parts of an acid terminated ester of pentaerythritol and chlorendic anhydride, with 50 parts of a lube oil extract. To this mixture was added at about 120° C. an equivalent amount of a glycidyl polyether of pentaerythritol and 1 part per 100 parts of glycidyl ether of alpha-methyl-benzyl dimethyl amine and the mixture stirred for about 2 minutes.

To 20 parts of this binder is added 15 parts of aluminum powder and 65 parts of bimodal ammonium perchlorate and the mixture mixed and cured as in Example I. The resulting product is a flexible propellant.

*Example XV*

A binder composition is prepared by mixing at 150° C., 60 parts of lube oil extract as in Example I with 33 parts of an acid terminated ester of glycerol and chlorendic anhydride. To this mixture is added an equivalent amount of a 1/1 mixture of polyether A and a glycidyl ether of glycerol and a catalyst comprising 1 part per 100 parts of the 1:1 mixture of alpha-methylbenzyl dimethyl amine, and the mixture stirred at 120° C. for 2 minutes. A propellant is prepared from this as in Example I.

*Example XVI*

The preceding example is repeated with the exception that the mixture is made up of 7.78 parts of a glycidyl ether of pentaerythritol, 15.87 parts of the acid terminated polyester, 1.18 parts of catalyst and 59.29 parts of lube oil extract. The resulting propellant is strong and has good flexibility.

*Example XVII*

Example IV was repeated with the exception that the asphalt was replaced by a 1/1 mixture of the lube oil extract of Example I and asphalt. The components were combined in the ratio 7.88 parts polyether A, 41.38 acid, 49.26 bitumen material and 1.48 catalyst. The resulting product had an elongation of 45%, tensile strength of 59 p.s.i. and stress relaxation slope of −0.10.

*Example XVIII*

Example IV was repeated with the exception that the asphalt was replaced with lube oil extract of Example I. The components were combined in a ratio of 6.90 parts polyether A, 42.36 parts acid and 49.26 parts of the lube oil extract. The resulting cured product had an elongation of 57%, tensile strength of 40 p.s.i. and stress relaxation slope of −0.10.

*Example XIX*

Example I is repeated with the exception that the lube oil extract is replaced by each of the following: refined coal tar, middle oil, coal tar pitch and No. 3 oil. Related results are obtained in each case.

*Example XX*

Example I is repeated with the exception that the acid is replaced with an equivalent amount of a polythiopolymercaptan having a molecular weight of about 1000. Related results are obtained.

*Example XXI*

Example I is repeated with the exception that the acid is replaced with an amine-terminated polyamide of dimerized linoleic acid and diethylene triamine. Related results are obtained.

*Example XXII*

A binder was prepared by combining 12% by weight of polyether A, 52% by weight of a mixture of 90 parts coal tar RT12 and 10 parts dinonyl phenol. To this mixture was added 36% by weight of a polythiopolymercaptan having the structure

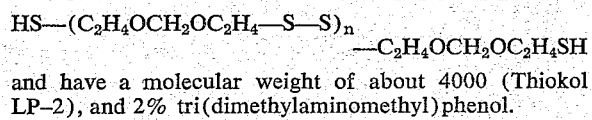

and have a molecular weight of about 4000 (Thiokol LP-2), and 2% tri(dimethylaminomethyl)phenol.

A propellant is prepared from this binder as shown in Example I. The resulting cured product is a strong flexible propellant.

*Example XXIII*

A binder was prepared by combining 12% by weight of polyether A, 60 parts straight run asphalt and 40 parts dinonyl phenol. To this mixture was added 36% by weight of a polythiopolymercaptan having the structure as in the preceding example and having a molecular weight of about 2000, and 2% by weight of tri(dimethylaminoethyl)phenol.

This binder was used to prepare a propellant as shown in Example I. The resulting cured product is a strong flexible propellant.

*Example XXIV*

The preceding example was repeated with the exception that the bituminous material is a medium curing cutback asphalt 100–200 SSF at 140° F. Related results are obtained.

*Example XXV*

Example I is repeated with the exception that the extract is replaced with an industrial fuel oil having the following properties:

| | |
|---|---|
| Gravity, ° API | 8.0 |
| Flash, PMCC, ° F | 180 |
| Pour point, ° F | +35 |
| Viscosity, centistokes | 370 |
| Sulfur, percent w | 1.84 |
| Carbon residue, percent w | 19.0 |

Related results are obtained.

We claim as our invention:

1. A solid propellant comprising a composition having an inorganic oxidizer salt dispersed in a cured reaction product of a mixture comprising (1) a polyepoxide having more than one vic-epoxy group, (2) an epoxy curing agent, and (3) a bituminous material which is fusible, largely soluble in carbon disulfide, has a softening point below 150° F. and which is substantially soluble in the uncured polyepoxide at 60° C. to 100° C.

2. A solid propellant comprising a composition having from 50% to 90% by weight of a solid inorganic oxidizing salt dispersed in a cured reaction product of a mixture comprising (1) a liquid polyepoxide having more than one vic-epoxy group, (2) a polymerized unsaturated long chain fatty acid, and (3) a bituminous material which is fusible, largely soluble in carbon disulfide, derived from petroleum, has a softening point below 150° F. and which is substantially soluble in the uncured polyepoxide at 60° C. to 100° C.

3. A solid propellant as in claim 2 wherein the propellent also contains dispersed aluminum powder.

4. A solid propellant as in claim 2 wherein the inorganic oxidizing salt is ammonium perchlorate.

5. A solid propellant as in claim 2 wherein the bituminous material is a lube oil extract.

6. A solid propellant as in claim 2 wherein the bituminous material is a soft asphalt from aromatic naphthenic crude oils.

7. A solid propellant as in claim 2 wherein the polyepoxide is a glycidyl polyether of a polyhydric phenol having a molecular weight up to 900 and an epoxy equivalency greater than 1.1.

8. A solid propellant as in claim 2 wherein the polymerized long chain fatty acid is trimerized $C_{18}$ unsaturated fatty acid.

9. A solid propellant as in claim 2 wherein the polyepoxide is epoxidized methyl tetrahydrobenzyl methyl tetrahydrobenzoate.

10. A solid propellant as in claim 2 wherein the polyepoxide is a condensate of a glycidyl polyether and dimerized linoleic acid.

11. A solid propellant as in claim 2 wherein the polyepoxide is a glycidyl ester of a polymerized $C_{18}$ unsaturated fatty acid.

12. A solid propellant as in claim 2 wherein the polyepoxide is a mixture of a glycidyl ester of a polycarboxylic acid and a glycidyl polyether.

13. A solid propellant composition comprising a composition having an inorganic oxidizer salt, aluminum metal powder dispersed in a cured reaction product of a mixture comprising (1) a glycidyl polyether of a polyhydric phenol, (2) a polymerized unsaturated fatty acid, and (3) an extract of a lube oil distillate.

14. A solid propellant composition comprising a composition having an inorganic oxidizer salt, aluminum metal powder dispersed in a cured reaction product of a mixture comprising (1) a glycidyl polyether of a polyhydric phenol, (2) a polymerized unsaturated fatty acid, and (3) an asphalt.

15. A solid propellant composition comprising a composition having an inorganic oxidizer salt and aluminum powder dispersed in a cured reaction product of (1) a polyepoxide having more than one vic-epoxy group, (2) a polythiopolymercaptan, and (3) a petroleum derived bituminous material which is fusible and largely soluble in carbon disulfide.

16. A solid propellant composition comprising a composition having an inorganic oxidizer salt comprising a member of the group consisting of ammonium and metal inorganic salts dispersed in a cured reaction product of (1) a polyepoxide having more than one vic-epoxy group, (2) an amino-hydrogen containing polyamide of a polycarboxylic acid and an aliphatic polyamine, and (3) a petroleum derived bituminous material.

17. A process for preparing a solid propellant which comprises mixing a solid inorganic oxidizer salt with a resinous binder comprising a mixture of (1) a polyepoxide having more than one vic-epoxy group, (2) an epoxy curing agent and (3) a bituminous material which is fusible, largely soluble in carbon disulfide, has a softening point below 150° F. and which is substantially soluble in the uncured polyepoxide at 60° C. to 100° C., and heating the mixture to a temperature below about 150° F.

18. A process for preparing a solid propellant which comprises mixing a solid inorganic oxidizing salt and an aluminum powder with a resinous binder comprising a mixture of (1) a polyepoxide having more than one vic-epoxy group, (2) a polymerized unsaturated long chain acid, and (3) a bituminous material which is fusible, largely soluble in carbon disulfide, has a softening point below 150° F. and which is substantially soluble in the uncured polyepoxide at 60° C. to 100° C., and heating the mixture at a temperature between 100° F. and 150° F. until the product has set.

19. A process for preparing a solid propellant which comprises mixing from 40 to 70% by weight of ammonium perchlorate and 5% to 20% by weight of aluminum powder with 10% to 55% by weight of a resinous binder comprising a mixture of (1) a glycidyl polyether of a polyhydric phenol, (2) a polymerized unsaturated fatty acid containing more than 12 carbon atoms, and (3) an extract of a lube distillate, and heating the mixture at a temperature between 100° F. and 150° F. until the mixture has set.

20. A process as in claim 17 wherein the polyepoxide is a glycidyl ester of a polymerized $C_{18}$ unsaturated fatty acid.

21. A process as in claim 17 wherein the polyepoxide is a glycidyl ester of dimerized linoleic acid.

22. A solid propellant comprising a composition having from 50% to 90% by weight of a solid inorganic oxidizer salt dispersed in a cured reaction product of a mixture comprising (1) a glycidyl polyether of a polyhydric phenol, (2) a copolymer of butadiene and acrylic acid, and (3) an asphalt.

23. A solid propellant comprising a composition having from 50% to 90% by weight of a solid inorganic oxidizer salt dispersed in a cured reaction product of a mixture comprising (1) a glycidyl polyether of a polyhydric phenol, (2) an acid-terminated partial ester of pentaerythritol and chlorendic anhydride, and (3) an asphalt.

24. A solid propellant comprising a composition having from 50% to 90% by weight of a solid inorganic oxidizer salt dispersed in a cured reaction product of a mixture comprising (1) a glycidyl polyether of a polyhydric phenol, (2) an acid-terminated partial ester of pentaerythritol and dimerized linoleic acid, and (3) an asphalt.

25. A solid propellant comprising a composition having from 50% to 90% by weight of a solid inorganic oxidizer salt selected from the group consisting of ammonium perchlorate, ammonium nitrate, potassium nitrate, sodium nitrate, $KClO_4$, $LiClO_4$, nitronium perchlorate, potassium dichromate, dispersed in a cured reaction product phenol, (2) an epoxy resin curing agent of the group consisting of acidic curing agents, polythiopolymercaptans and compounds containing a plurality of amino hydrogen, and (3) a bituminous material of the group consisting of asphalts, high boiling extracts of petroleum products, residual fuel oils, coal tars, refined coal tars and coal tar pitches.

References Cited in the file of this patent

UNITED STATES PATENTS

| | | |
|---|---|---|
| 3,002,830 | Barr | Oct. 3, 1961 |
| 3,012,867 | Bowman | Dec. 12, 1961 |
| 3,022,149 | Cramer | Feb. 20, 1962 |
| 3,028,271 | Dixon et al. | Apr. 3, 1962 |